March 7, 1967 L. S. GREER 3,307,823
PILOT CONTROLLED VALVE HAVING IMPROVED SEALING MEANS
Filed Oct. 28, 1963
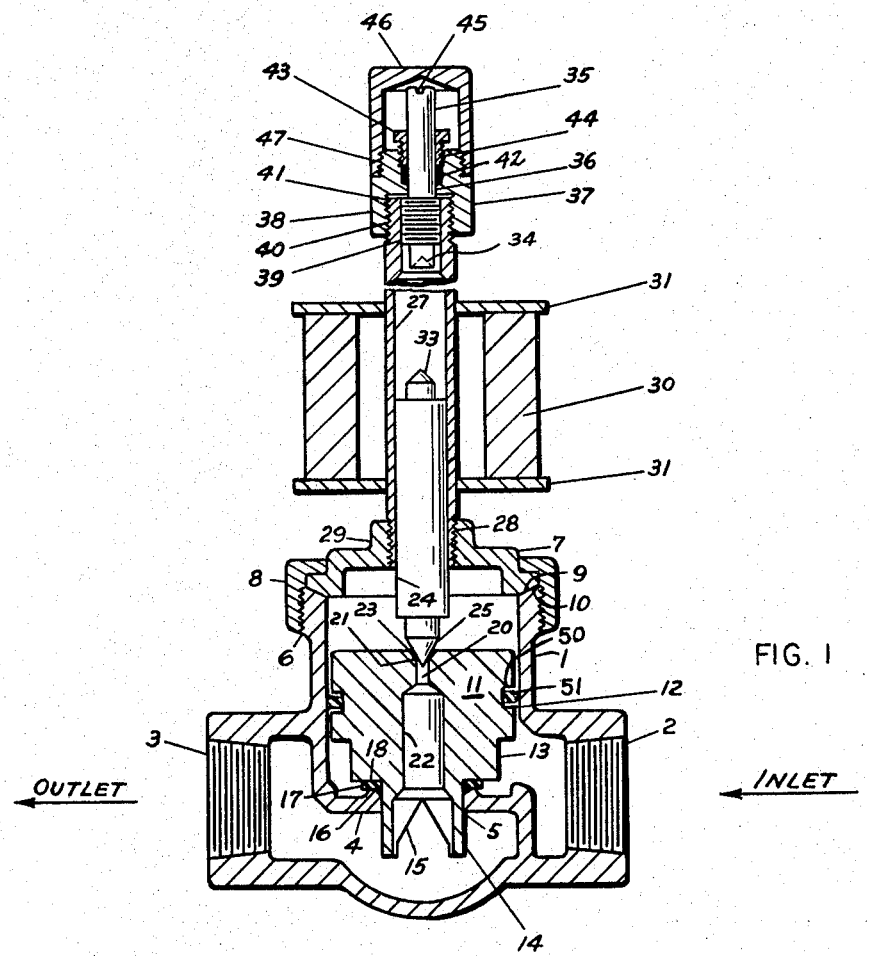
FIG. 1
OUTLET
INLET
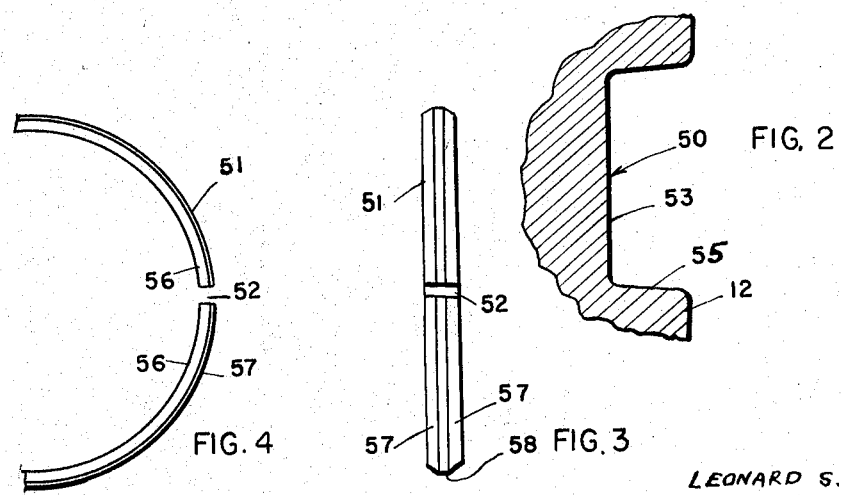
FIG. 2
FIG. 4
FIG. 3
LEONARD S. GREER
by Charles L. Lovercheck
atty though from the outlet port 3.

United States Patent Office 3,307,823
Patented Mar. 7, 1967

---

3,307,823
PILOT CONTROLLED VALVE HAVING IMPROVED SEALING MEANS
Leonard S. Greer, Erie, Pa., assignor to Hays Manufacturing Company, Erie, Pa., a corporation of Pennsylvania
Filed Oct. 28, 1963, Ser. No. 319,292
3 Claims. (Cl. 251—30)

This invention relates generally to valves and, more particularly, to magnetically controlled valves which may be utilized in a fluid line.

It is an object of this invention to improve existing valves and, more particularly, it is an object of this invention to provide a magnetically controlled self-closing valve which is simple in construction, economical to manufacture, light in weight, and positive in operation.

Another object of this invention is to provide a magnetically controlled self-closing valve in which an improved piston ring is used.

A further object of the invention is to provide a magnetically controlled self-closing valve in which the piston having an improved ring therein moves with pressure to close the port therein.

Still a further object of the inventon is to provide a piston and guide therefor in a self-closing valve having an improved piston ring to control the opening and closing of the flow port in the valve.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a vertical sectional view of a magnetically controlled self-closing valve according to the invention;

FIG. 2 is an enlarged partial sectional view of a part of the piston;

FIG. 3 is an enlarged edge view of the piston ring; and

FIG. 4 is a partial top view of the piston ring.

Referring now to the drawing, a cylindrically shaped body 1 is shown having laterally extending inlet and outlet ports 2 and 3 and a laterally extending inner partition 4. The partition 4 has a centrally disposed aperture or port 5 between the inlet port 2 and outlet port 3 of the valve body 1. An enlarged threaded portion 6 is provided on the upper part of the valve body 1 and it has seated thereon a flanged cap member 7 secured by a threaded locking member 8 threadably engaging the threaded portion 6 of the body 1. The cap member 7 has a bevelled seating portion 10 on the upper end of the valve body 1 to provide metal to metal sealing contact.

A piston 11 has a flange 12 and a reduced size end 13. The piston 11 reciprocates in the cavity in the body 1 and is slightly smaller than the bore in which it slides. The piston 11 has a cylindrical guiding portion 14 with an inverted V-shaped slot 15 which extends through the port 5 in the partition 4 to guide the lower end of the piston 11. A marginal beaded seating portion 16 is formed around the port 5 and engages a bonded rubber seat 17 on the lower end 18 of the piston 11. The piston 11 has a centrally disposed orifice 20 with a tapered countersunk seat 21 leading into an enlarged orifice 22 in the lower portion of the piston 11. The tapered countersunk seat 21 has a bonded rubber surface 23.

A reciprocable plunger 24 has a tapered seating portion 25 for engaging the tapered seat 21 in the piston 11. The plunger 24 reciprocates in a sleeve 27 having a threaded portion 28 which threadably engages a threaded flanged portion 29 on the cap member 7. A solenoid 30 having flanges 31 on the ends thereof is fixed to and disposed around the sleeve 27.

The upper end of the armature or plunger 24 has a tapered projecting end 33 for engaging a tapered seating portion 34 in the end of an adjusting screw 35. The adjusting screw 35 is disposed in an aperture 36 of a threaded member 37 and it has an enlarged threaded portion for engaging internal threads 39 on the upper end of the sleeve 27.

The member 37 has internal threads 40 for threadably engaging a threaded portion 41 on the upper end of the sleeve 27. A suitable washer 42 and gland member 43 are disposed in a threaded recess 44 in the upper end of the member 37. The adjusting screw 35 has a cross slot 45 for engagement by a screw driver or any other suitable tool. A threaded cap member 46 is threadably engaged with an outer threaded portion 47 of the member 37 to protect and cover the outer end of the adjusting screw 35.

The flange 12 on the piston 11 has a piston ring groove 50 which receives a piston ring 51. The piston ring 51 is not a completely closed ring but has a gap 52. The ring itself is made of nylon, teflon, polyethylene, or a material of fairly rigid properties being self-lubricating.

The groove 50 in the piston 11 has a flat bottom 53 and side walls 55 which diverge outwardly and from each other at an angle of approximately eight degrees. The groove is slightly less in depth than the thickness of the ring. The ring is wedge shaped in cross section; that is, it has flat sides 56 and outwardly extending sides 57 which converge toward each other and a flat crest 58. The outside diameter of the ring is wedge shaped in order to bite through any dirt particles which might be on a wall.

In operation, the gap between the ends of the ring 51 acts as a "bleed," permitting fluid to reach the top of the piston from the inlet port 2. This gap is calibrated to coordinate with the outflow of water through the plunger seat hole.

When water pressure is applied to the bottom of the piston, the ring is forced to the top of the groove and outward against the cylinder bore, leaving a clearance space between the ring inside diameter and the side of the groove and between the ring bottom and the bottom of the groove. This is during the opening of the valve and during its remaining open position.

On the closing cycle, the ring is forced to the bottom of the groove. This motion and the pulse of water involved clean the groove of dirt and sand particles.

When it is desired to move the plunger 24 upwardly, the solenoid 30 is actuated and will move the plunger 24 up off of the seat 21. When the plunger 24 is moved upwardly, liquid passes from the chamber above the head of the piston 11 through the control orifice 20, thereby causing the pressure in the chamber above the piston 11 to decrease materially below the pressure in the supply line. Because of this decrease in pressure in the upper portion of the body 1, the piston 11 will rise, thereby moving the seat 17 away from the seating portion 16.

The inverted V-shaped ports or slots 15 in the guiding portion 14 of the piston 11 permit the liquid to increase its flow gradually from the inlet port 2 to the outlet port 3 until the piston 11 is raised to the upper end of the body 1 wherein full flow of liquid takes place through the flow port 5 of the partition 4.

In closing the valve, the solenoid 30 is deenergized. The plunger 24 will move down it and the tapered portion 25 of the plunger 24 will sealingly engage the tapered seat 21 of the piston 11. The flow of fluid through the control orifice 20 is thereby stopped and liquid will then pass upwardly through the gap 52 into the chamber above the piston 11 between the outer portion of the piston 11 and the inner side wall of the body 1. This will force the piston 11 down.

The foregoing specification sets forth the invention in its preferred practical forms but it will be understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a valve and a magnetic operating means for said valve,
   said valve comprising a hollow cylindrical body having an enlarged portion at one side thereof,
   a partition in said cylindrical body having an opening therein,
   a piston having an orifice,
   said piston disposed in said enlarged portion,
   said piston having means to close said opening when said piston is in closed position,
   said opening being open when said piston is in open position,
   said enlarged portion having a chamber therein adapted to receive fluid to hold said piston in closed position,
   and a piston ring on said piston,
   said piston ring having two spaced ends defining a flow passage for fluid to flow into said chamber,
   said piston ring having outer sides which converge outwardly toward each other and define a crest,
   said crest slidably engaging the undersurface of said enlarged portion.

2. In combination, a valve and a magnetic operating means for said valve,
   said valve comprising a hollow cylindrical body having an enlarged portion at one side thereof,
   a partition in said cylindrical body having an opening therein,
   a piston having an orifice,
   said piston disposed in said enlarged portion,
   said piston having means to close said opening when said piston is in closed position,
   said opening being open when said piston is in open position,
   said enlarged portion having a chamber therein adapted to receive fluid to hold said piston in closed position,
   and a piston ring on said piston,
   said piston ring having two spaced ends defining a flow passage for fluid to flow into said chamber,
   said ring being wedge shaped in cross section.

3. The combination recited in claim 2 wherein said piston ring is made of a self-lubricating material.

References Cited by the Examiner

UNITED STATES PATENTS 2,625,953  1/1953  Miller _____ 251—30
2,877,071  3/1959  Arnot _____ 277—216 X

FOREIGN PATENTS 575,631  5/1959  Canada.

M. CARY NELSON, *Primary Examiner.*

LAVERNE D. GEIGER, *Examiner.*

E. K. FEIN, *Assistant Examiner.*